(12) United States Patent
Inoue et al.

(10) Patent No.: US 7,650,818 B2
(45) Date of Patent: Jan. 26, 2010

(54) BICYCLE SHAFT COMPONENT

(75) Inventors: Hideya Inoue, Osaka (JP); Masahiro Yamanaka, Osaka (JP)

(73) Assignee: Shimano Inc., Osaka (JP)

( * ) Notice: Subject to any disclaimer, the term of this patent is extended or adjusted under 35 U.S.C. 154(b) by 322 days.

(21) Appl. No.: 11/693,885

(22) Filed: Mar. 30, 2007

(65) Prior Publication Data

US 2008/0238029 A1    Oct. 2, 2008

(51) Int. Cl.
*B62M 3/00*    (2006.01)
(52) U.S. Cl. .................... 74/594.1; 464/181
(58) Field of Classification Search ............... 464/181; 301/2.5, 110.5; 74/594.2, 594.1; 280/281.1
See application file for complete search history.

(56) References Cited

U.S. PATENT DOCUMENTS

| | | | |
|---|---|---|---|
| 446,280 A * | 2/1891 | Blakely | 74/594.1 |
| 4,348,247 A | 9/1982 | Loyd et al. | |
| 4,424,981 A * | 1/1984 | Maxwell, III | 301/110.5 X |
| 5,485,905 A | 1/1996 | Rader, III | |
| 6,059,171 A * | 5/2000 | Yamanaka et al. | 74/594.2 X |
| 6,213,488 B1 | 4/2001 | Filice et al. | |
| 6,863,763 B2 * | 3/2005 | Lee et al. | 464/181 X |
| 2004/0082394 A1 | 4/2004 | Lee et al. | |
| 2004/0154430 A1 | 8/2004 | Yamanaka | |
| 2004/0162172 A1 | 8/2004 | Yamanaka et al. | |
| 2005/0176513 A1 * | 8/2005 | Raymond et al. | 464/181 |
| 2006/0103106 A1 | 5/2006 | Schlanger | |

FOREIGN PATENT DOCUMENTS

EP    1426282 B1    12/2006

OTHER PUBLICATIONS

Hausmann et al. Physics. N.Y., D. Van Nostrand Company,1939. pp. 191 and 192.*

* cited by examiner

*Primary Examiner*—Greg Binda
(74) *Attorney, Agent, or Firm*—Global IP Counselors, LLP

(57) ABSTRACT

A bicycle shaft component includes an outer tubular member and an inner member non-movably attached to the outer member. The outer tubular member includes a first end portion and a second end portion with an interior longitudinal passageway extending between the first and second end portions. The interior longitudinal passageway has a longitudinal center axis extending through it. The inner member is non-movably attached to the outer tubular member within the interior longitudinal passageway. The outer tubular member is constructed of a first material having a first specific gravity and the inner member is constructed of a second material having a second specific gravity that is lower than the first specific gravity of the first material.

23 Claims, 7 Drawing Sheets

BICYCLE SHAFT COMPONENT

BACKGROUND OF THE INVENTION

1. Field of the Invention

This invention generally relates to a bicycle shaft component. More specifically, the present invention relates to a bicycle shaft having a tubular outer member and a lighter weight material inner member attached within the tubular outer member.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle shaft component.

Bicycles utilize shaft components in a number of areas on the bicycle. For example, shaft components are utilized within the crank assemblies as crank axles, and within hub assemblies as hub axles. In the past, shaft components were constructed as solid metal rods. These shaft components were relatively heavy. Accordingly, more recently, shaft components have been constructed as solid rods from lighter weight metal alloys and/or have been constructed as tubular members in order to reduce weight. Tubular shaft components have been most widely used when the shaft component has a relatively wide width (i.e. where a solid shaft component would be very heavy). In either case, these prior shaft components are still not always as strong and/or lightweight as desired by some riders. Moreover, these prior shaft components can be relatively complicated and/or expensive to manufacture and/or assemble.

In view of the above, it will be apparent to those skilled in the art from this disclosure that there exists a need for an improved bicycle shaft component. This invention addresses this need in the art as well as other needs, which will become apparent to those skilled in the art from this disclosure.

SUMMARY OF THE INVENTION

One object of the present invention is to provide a bicycle shaft component that is relatively strong, yet relatively lightweight.

Another object of the present invention is to provide a bicycle shaft component that is relatively simple and/or inexpensive to manufacture and/or assemble.

The foregoing objects can basically be attained by providing a bicycle shaft component that includes an outer tubular member and an inner member. The outer tubular member includes a first end portion and a second end portion with an interior longitudinal passageway extending between the first and second end portions. The interior longitudinal passageway has a longitudinal center axis extending through it. The inner member is non-movably attached to the outer tubular member within the interior longitudinal passageway. The outer tubular member is constructed of a first material having a first specific gravity and the inner member is constructed of a second material having a second specific gravity that is lower than the first specific gravity of the first material.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
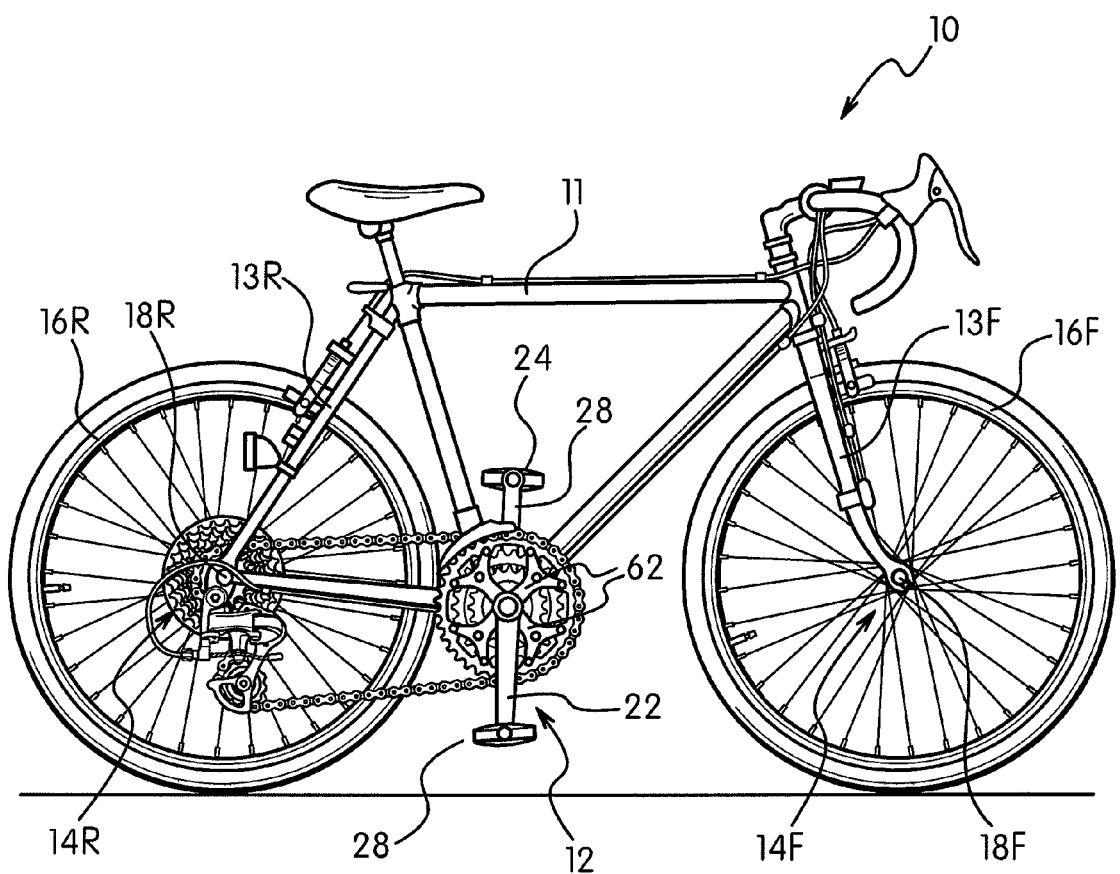
FIG. 1 is a side elevational view of a bicycle equipped with a crank assembly and front and rear hub assemblies in accordance with the present invention.
Figure 2:
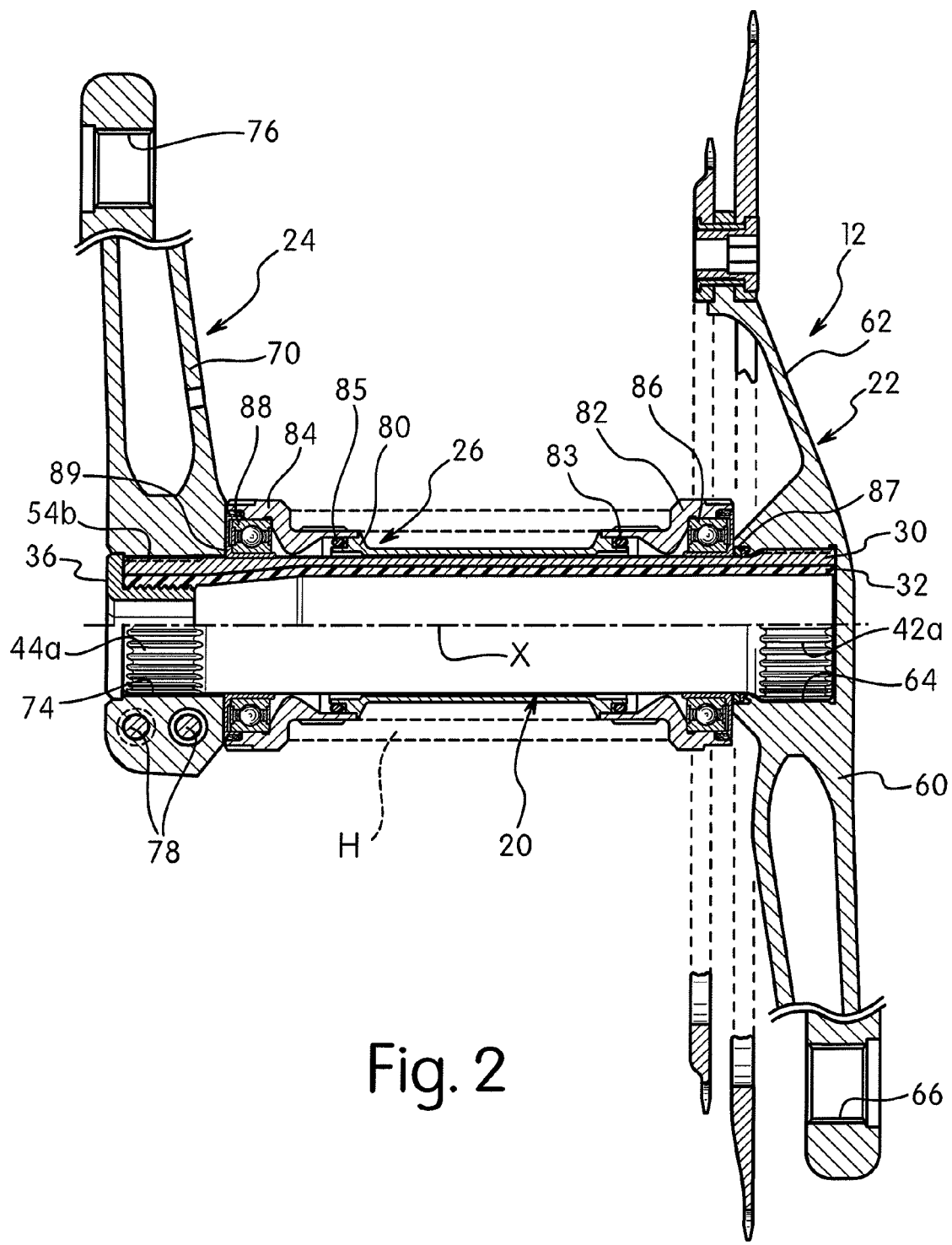
FIG. 2 is an enlarged, partial cross-sectional view of the crank assembly illustrated in FIG. 1.
Figure 3:
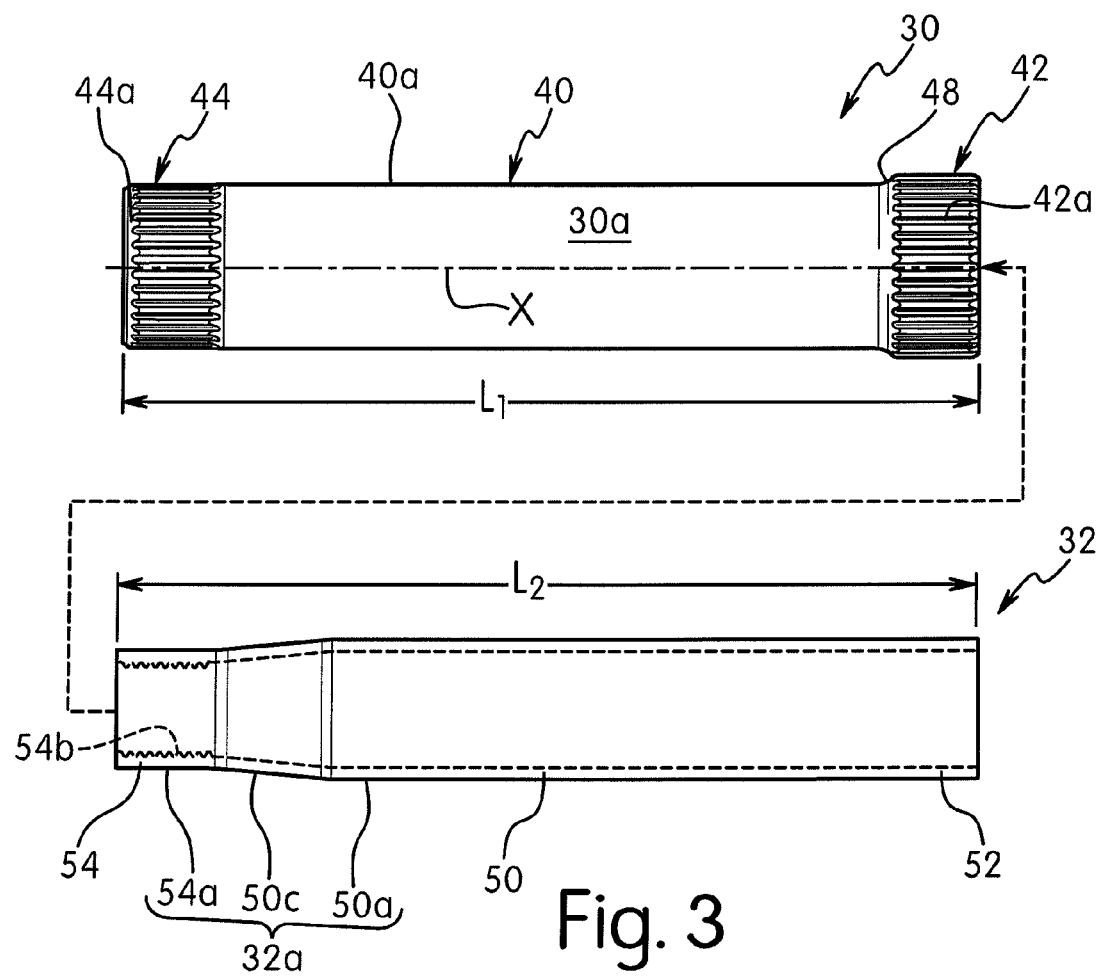
FIG. 3 is an exploded, longitudinal elevational view of the crank shaft of the crank assembly illustrated in FIG. 2.

Referring initially to FIGS. 1 and 2, a bicycle 10 is illustrated that is equipped with a crank assembly 12, a front hub assembly 14F and a rear hub assembly 14R in accordance with the present invention. The bicycle 10 basically has a diamond-shaped frame 11 with a front fork 13F pivotally coupled thereto and a rear fork or triangle 13R integrally formed therewith. A tubular hanger H is formed at the intersection of the seat tube and the down tube of the frame. The hanger H supports the crank assembly 12. The front and rear forks 13F and 13R support the front and rear hub assemblies 14F and 14R, respectively. Front and rear rims 16F and 16R are coupled to the front and rear hub assemblies 14F and 14R, respectively, via a plurality of spokes in a conventional manner. The front and rear hub assemblies 14F and 14R include front and rear hub shafts 18F and 18R, respectively, in accordance with the present invention. The crank assembly 12 includes a crank shaft 20 in accordance with the present invention.

The bicycle 10 is conventional, except for the crank assembly 12, the front hub assembly 14F and the rear hub assembly 14R. Accordingly, the bicycle 10 will not be explained and/or illustrated in detail herein, except as related to the crank assembly 12, the front hub assembly 14F and the rear hub assembly 14R. In other words, it will be apparent to those skilled in the bicycle art that the bicycle 10 includes various other conventional bicycle components such as front and rear brakes, front and rear derailleurs, front and rear shifters, etc. Moreover, it will be apparent to those skilled in the bicycle art from this disclosure that various modifications can be made to the bicycle 10 and its components without departing from the scope of the present invention.

Referring now to FIGS. 1-7, the crank assembly 12 will now be explained in more detail. The crank assembly 12 basically includes the crank shaft 20, a right crank arm 22, a left crank arm 24 and a bottom bracket structure 26. The crank arms 22 and 24 are non-rotatably mounted to opposite ends of the crank shaft 20. The bottom bracket structure 26 is mounted in the tubular hanger H of the frame 11. The crank shaft 20 is rotatably supported by the bottom bracket structure 26 within the hanger H. A pedal 28 is mounted to the free end of each of the crank arms 22 and 24 so the rider can rotate the crank arms 22 and 24 to propel the bicycle 10 in a conventional manner.

The crank shaft 20 basically includes an outer tubular member 30 and an inner member 32 attached to the outer tubular member 30 within the outer tubular member 30 using an adhesive layer 34 to form non-separable unit. The outer tubular member 30 is rotatably supported by the bottom bracket structure 26, and has the right and left crank arms 22 and 24 non-rotatably attached to opposite ends thereof. An axle bolt 36 is threadedly mounted within one end of the crank shaft 20 after the remaining parts of the crank assembly 12 are fully assembled, as seen in FIG. 2.

The outer tubular member 30 is constructed of a first material having a first specific gravity and the inner member 32 is constructed of a second material having a second specific gravity that is lower than the first specific gravity of the first material. The first material of the outer tubular member 30 is preferably a metallic material, while the second material of the inner member 32 is preferably a non-metallic material. The outer tubular member 30 and the inner member 32 are preferably constructed as separate members from each other that are subsequently attached together using the adhesive layer 34, as explained below.

The outer tubular member 30 has a first overall axial length $L_1$. The inner member 32 has a second overall axial length $L_2$ that is at least 75% of the first axial length $L_1$. Preferably, the first and second overall axial lengths $L_1$ and $L_2$ are equal. In other words, the inner member 32 preferably extends along at least a majority of the outer tubular member 32 within the interior passageway 46.

Referring to FIGS. 2-6, the outer tubular member 30 basically includes a center portion 40, a first end portion 42, and a second end portion 44. The center portion 40 extends between the first and second end portions 42 and 44. The center portion 40 is rotatably mounted in the bottom bracket structure 26. The right crank arm 22 is non-rotatably mounted on the first end portion 42. The left crank arm 24 is non-rotatably mounted on the second end portion 44. An interior longitudinal passageway 46 extends through the outer tubular member 30 between the first and second end portions 42 and 44. The interior longitudinal passageway 46 has a longitudinal center axis X extending therethrough. The center axis X corresponds to the rotation axis of the crank assembly 12. The outer tubular member 30 has a circular shape, as viewed along the longitudinal center axis X.

As mentioned above, the tubular outer member 30 is preferably constructed of a metallic first material. More specifically, the outer tubular member 30 is preferably constructed of a metal alloy such as aluminum alloy (e.g., 2014 aluminum alloy). In other words, the first material preferably includes aluminum. Preferably, the center portion 40, the first end portion 42 and the second end portion 44 are integrally formed together as a one-piece, unitary member using conventional manufacturing techniques such as casting and/or machining, or the like. Moreover, the outer tubular member 30 preferably has a uniform material composition (i.e., a homogeneous material makeup) throughout.

The outer tubular member 30 has an external tubular surface 30a and an internal tubular surface 30b that extend between free edges of the first and second end portions 42 and 44. The external surface 30a includes a center or main external surface/section 40a extending along the center portion 40, a first externally splined surface or section 42a extending along the first end portion 42 and a second externally splined surface or section 44a extending along the second end portion 44. The internal surface 30b includes a central or main internal surface/section 40b extending along the first end portion 42 and part of the center portion 40, a reduced diameter internal surface or section 44b extending along the second end portion 44, and a (first) tapered section 40c extending between the central section 40b and the reduced diameter section 44b. The internal surface 30b defines the longitudinal passageway 46 of the outer tubular member 30.

Figure 5:
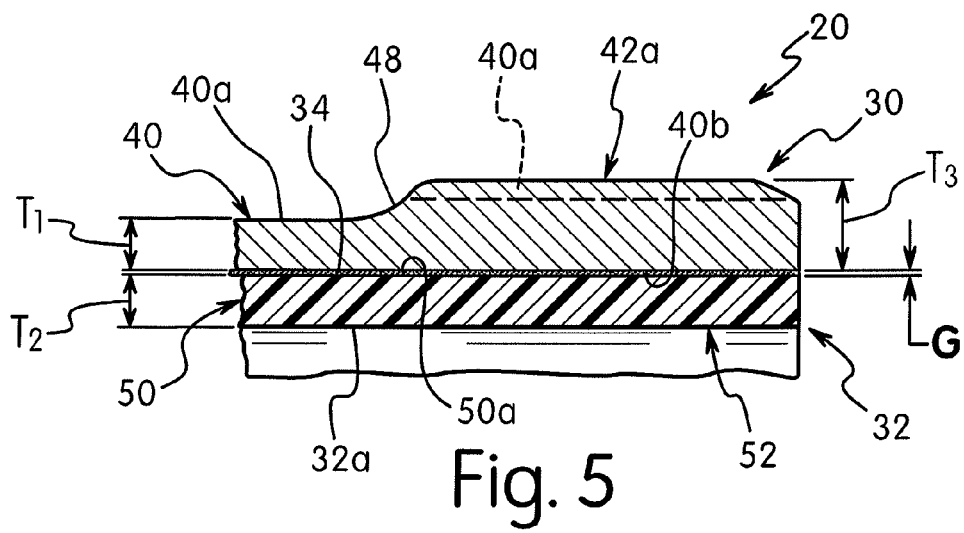
FIG. 5 is an enlarged, cross-sectional view of a portion of the assembled crank shaft identified with the circle S1 in FIG. 4.
Figure 6:
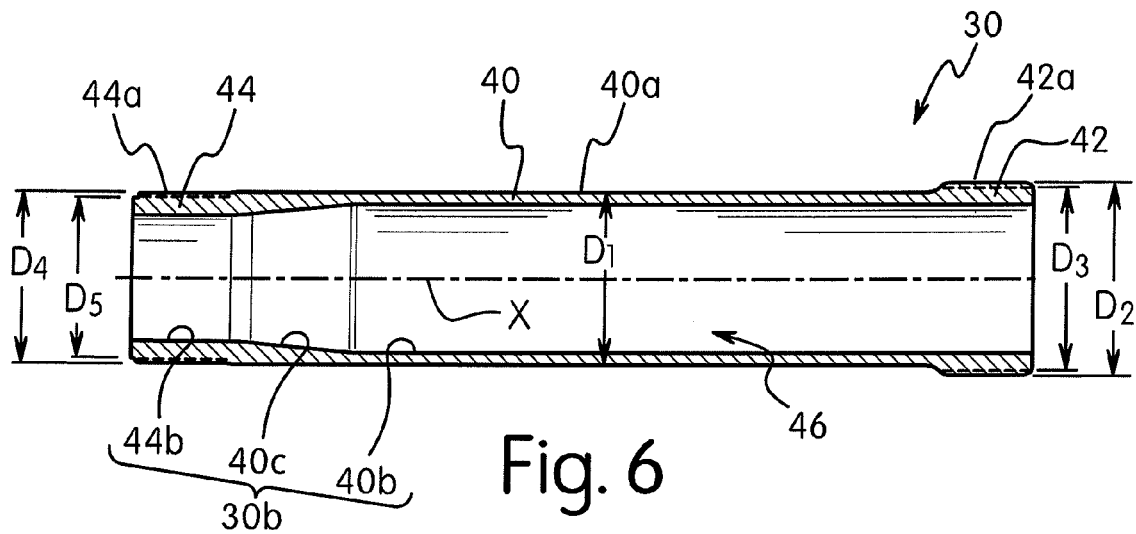
FIG. 6 is an enlarged, cross-sectional view of the outer tubular member of the crank shaft illustrated in FIGS. 2-4.
Figure 7:
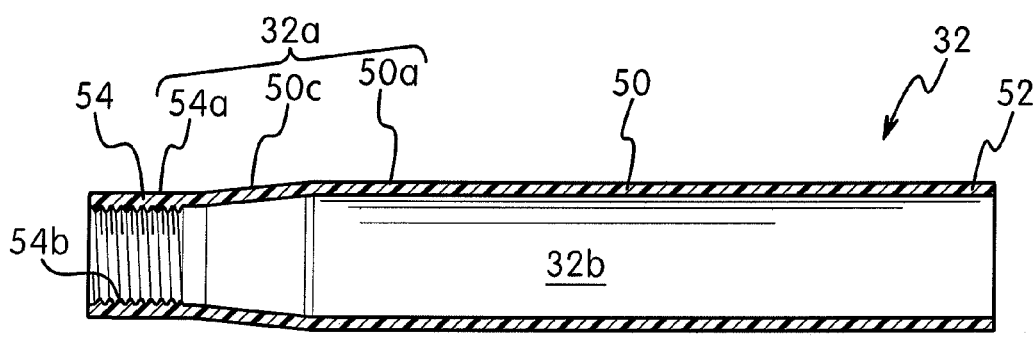
FIG. 7 is an enlarged, cross-sectional view of the inner tubular member of the crank shaft illustrated in FIGS. 2-4.
Figure 8:
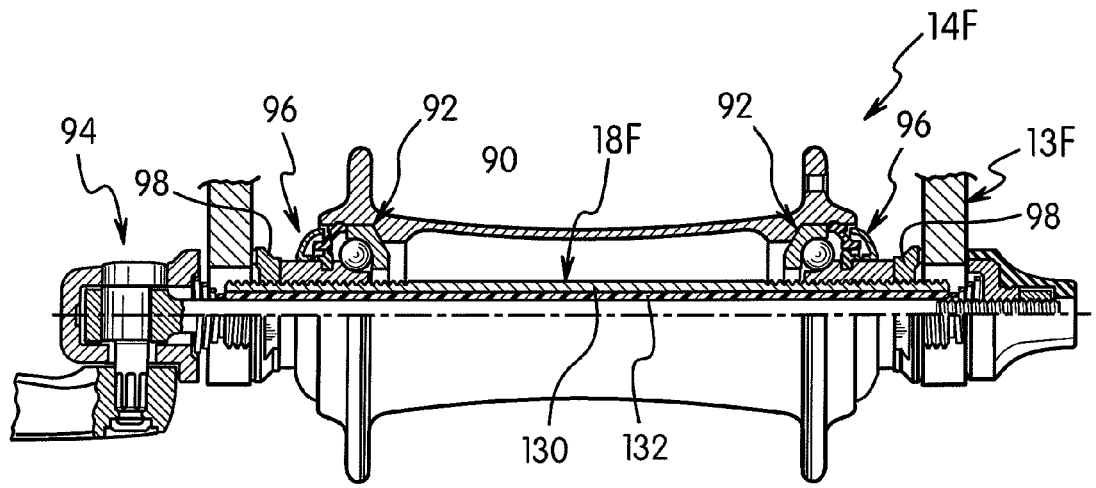
FIG. 8 is an enlarged, partial cross-sectional view of the front hub assembly illustrated in FIG. 1.
Figure 9:
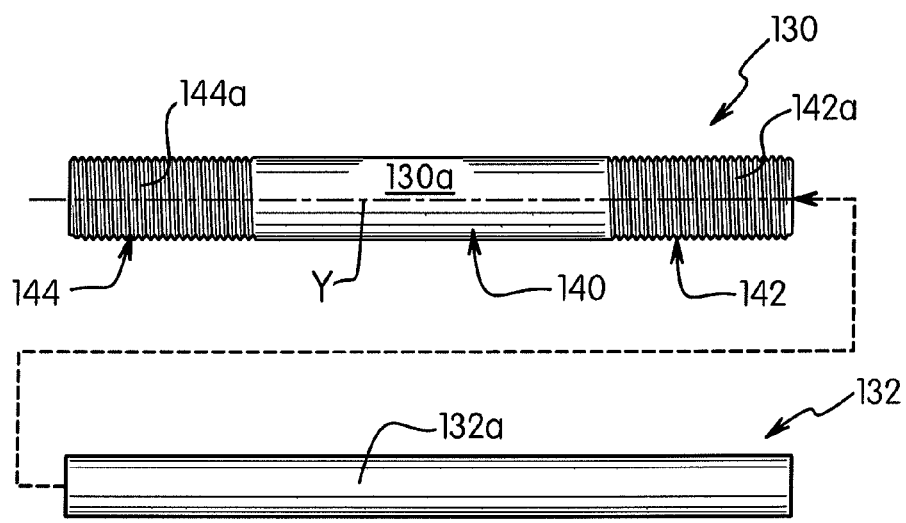
FIG. 9 is an exploded, longitudinal elevational view of the front hub shaft of the front hub assembly illustrated in FIG. 8.
Figure 10:
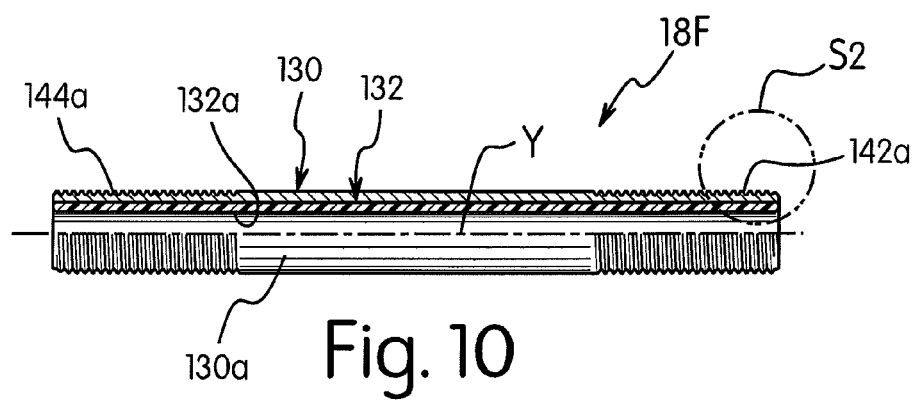
FIG. 10 is a longitudinal elevational view of the assembled front hub shaft of the front hub assembly illustrated in FIG. 8, with a portion illustrated in cross-section for the purpose of illustration.
Figure 11:
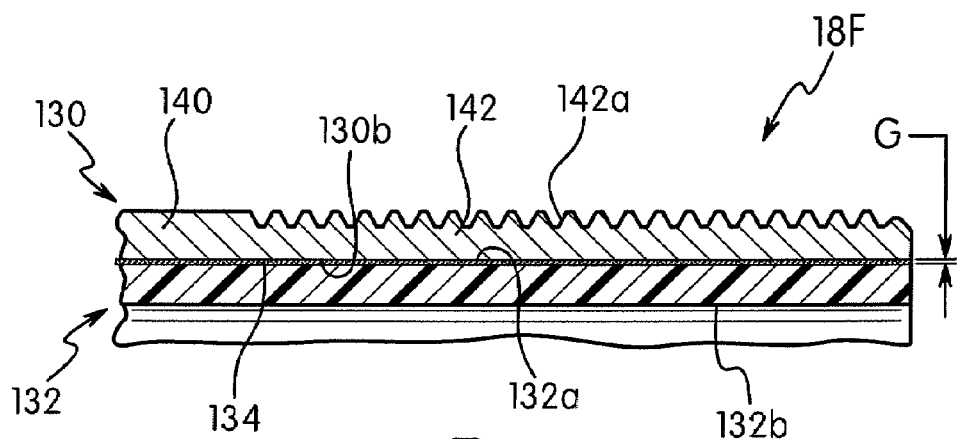
FIG. 11 is an enlarged, cross-sectional view of a portion of the assembled front hub shaft identified with the circle S2 in FIG. 10.
Figure 12:
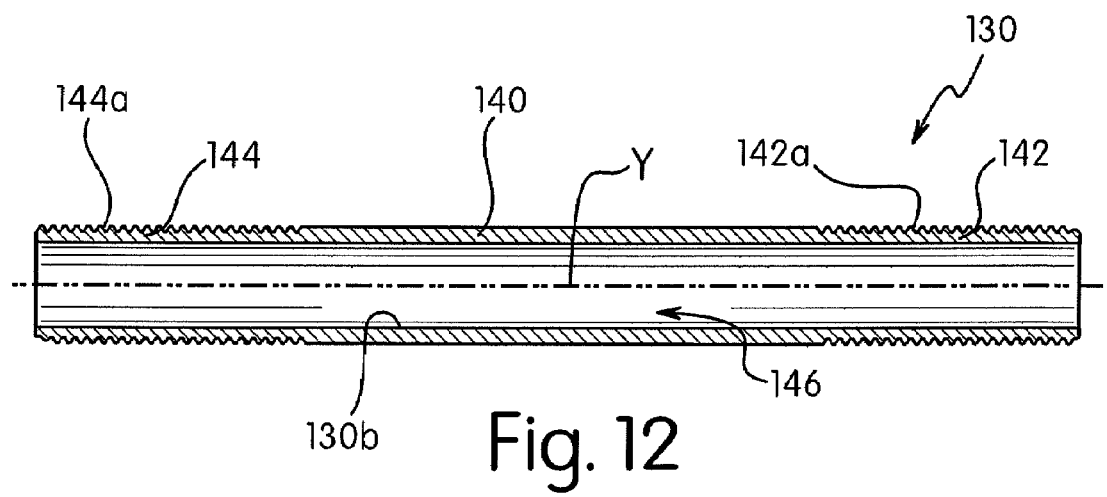
FIG. 12 is an enlarged, cross-sectional view of the outer tubular member of the front hub shaft illustrated in FIGS. 8-10.
Figure 13:
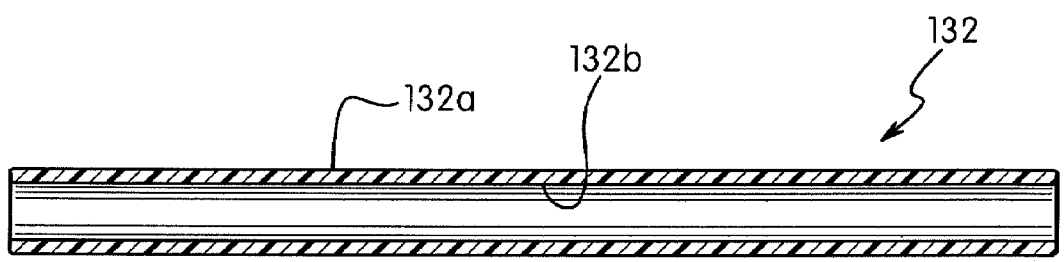
FIG. 13 is an enlarged, cross-sectional view of the inner tubular member of the front hub shaft illustrated in FIGS. 8-10.

Referring mainly to FIGS. 5-6, the outer tubular member 30 preferably has a (minimum) radial thickness $T_1$ along a majority that is smaller than a radial thickness $T_2$ of the inner member 32, which is preferably a tubular member in this embodiment. The inner member 32 has a substantially uniform radial thickness $T_2$ along its entire axial length. In this embodiment, the radial thickness $T_2$ of the inner member 32 is about 2.0 millimeters. Thus, the outer tubular member 30 preferably has a (minimum) radial thickness $T_1$ along a majority of its axial length (i.e., along the majority of the center portion 40) that is less than 2.0 millimeters. However, the first and second end portions 42 and 44 are preferably radially thicker to accommodate the splines (e.g., have maximum radial thicknesses $T_3$ about twice the minimum radial thickness $T_1$ or slightly smaller than twice the minimum radial thickness $T_1$). In other words, the outer tubular member 30 is relatively thin along a majority.

The outer tubular member 30 preferably has a uniform external diameter $D_1$ along a majority of an axial length between the first and second end portions 42 and 44 (i.e. along the central section 40a). The splined first section 42a preferably has a plurality of axially extending external splines that extend radially outwardly of the uniform external diameter $D_1$. On the other hand, the splined second section 44a preferably has a plurality of axially extending external splines that extend radially inwardly of the uniform external diameter $D_1$. Thus, the first splined section 42a is disposed at least partially radially outwardly of the second splined section 44a.

The first splined section 42a has a first maximum outer diameter $D_2$ and a first minimum outer diameter $D_3$ smaller than the first maximum outer diameter $D_2$. The outer diameters $D_2$ and $D_3$ pass through the peaks and valleys, respectively, of the splines of the first splined section (surface) 42a. The first end portion 42 is thicker in a radially outward direction than the center portion 40. The first minimum outer diameter $D_3$ is larger than the uniform outer diameter $D_1$. Thus, an annular abutment or shoulder 48 is formed between the central section 40a and the first splined section 42a of the external surface 30a. The annular abutment 48 is engaged by the right crank arm 22 when the right crank arm 22 is attached to the crank shaft 20, as explained below.

The second splined section 44a has a second maximum outer diameter $D_4$ and a second minimum outer diameter $D_5$ smaller than the second maximum outer diameter $D_4$. The outer diameters $D_4$ and $D_5$ pass through the peaks and valleys, respectively, of the splines of the second splined section (surface) 44a. The second end portion 44 is thicker in a radially inward direction than the center portion 40. The second maximum outer diameter $D_4$ is no larger than the uniform external diameter $D_1$ (equal as illustrated herein) so that the second end portion 44 can be inserted through the right crank arm 22. The second minimum outer diameter $D_5$ is smaller than the uniform outer diameter $D_1$. Thus, the first splined section 42a is preferably disposed radially outwardly of the second splined section 44a, such that the splined sections 42a and 44a of the external surface 30a do not overlap each other as viewed axially (i.e., the first minimum outer diameter $D_3$ is larger than the second maximum outer diameter $D_4$).

Referring to FIGS. 2-5 and 7, the inner member 32 will now be explained in more detail. The inner member 32 is preferably a tubular member having an external shape corresponding to the internal shape of the outer tubular member 30. The inner member 32 is non-movably attached to the outer tubular member 30 within the interior longitudinal passageway 46 of the outer tubular member 30 using the adhesive layer 34, as explained in more detail below. The inner member 32 includes a center portion 50, a first end portion 52 and a second end portion 54. The center portion 50 extends between the first and second end portions 52 and 54. The inner member 32 has a circular shape, as viewed along the longitudinal center axis X.

As mentioned above, the inner member 32 is preferably constructed of a non-metallic second material. More specifically, the inner member 32 is preferably constructed of fiber reinforced synthetic material such as an epoxy resin impregnated with carbon fibers. In other words, the second material preferably includes carbon fibers. Preferably, the center portion 50, the first end portion 52 and the second end portion 54 are integrally formed together as a one-piece, unitary member using conventional manufacturing techniques such as layering, casting, molding and/or heating, or the like. Moreover, the inner member 32 preferably has a substantially consistent material composition (i.e., a uniform structure or make-up) throughout. The carbon fibers can be arranged as randomly oriented fibers and/or unidirectional fibers. Layers of unidirectional fibers can be arranged in the same or varying orientations relative to each other. In other words, the inner member 32 is preferably constructed of a uniform mixture of carbon fibers and epoxy resin, except for the varying orientation/location of the carbon fibers. If such a unidirectional carbon fiber sheet is used to construct an inner member, it is preferable to arrange the unidirectional carbon fiber sheet so that the direction of carbon fiber intersects with the axial direction of the inner member. Such arrangement effectively enhances the rigidity of the inner member. Construction of the inner member 32 will be explained in more detail below.

The inner member 32 has an external tubular surface 32a and an internal tubular surface 32b that extend between free edges of the first and second end portions 52 and 54. The external surface 32a includes a central or main external surface/section 50a extending along the first end portion 52 and part of the center portion 50, a reduced diameter external surface or section 54a extending along the second end portion 54, and a (second) tapered section or surface 50c extending between the central section 50a and the reduced diameter section 54a. In the illustrated embodiment, the internal surface 32b preferably has a shape corresponding to the external surface 32a, but with a smaller diameter such that the inner member 32 has a substantially uniform radial thickness along its entire axial length, as mentioned above. However, the internal surface 32b preferably has a threaded internal surface or section 54b disposed at the second end portion 54 in order to threadedly receive the axle bolt 36 therein.

Figure 4:
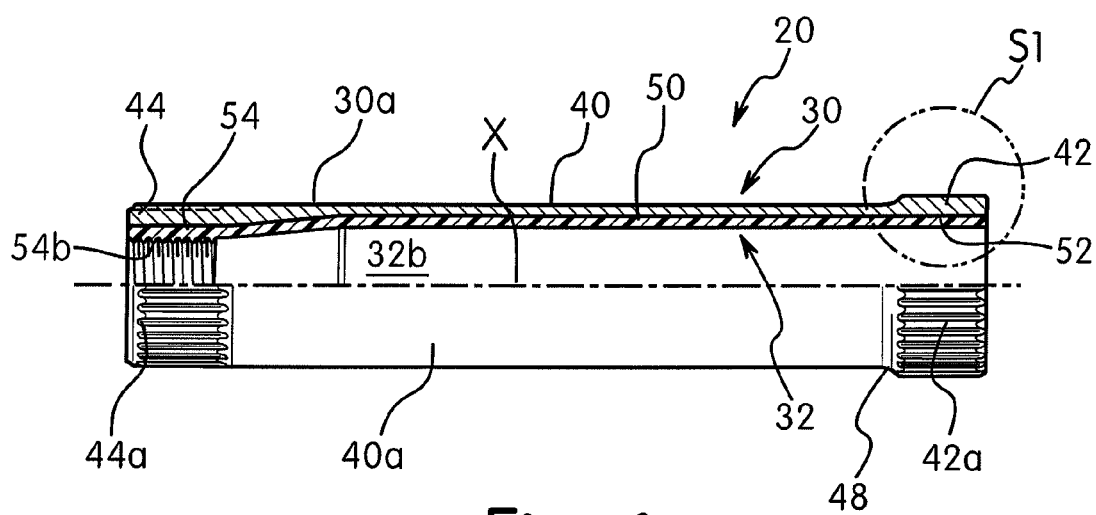
FIG. 4 is a longitudinal elevational view of the assembled crank shaft of the crank assembly illustrated in FIG. 2, with a portion illustrated in cross-section for the purpose of illustration.

Preferably, the main external section 50a, the reduced diameter external section 54a and the (second) tapered section 50c of the inner member 32 correspond in shape and location to the main internal section 40b, the reduced diameter internal section 44b and the (first) tapered section 40c, respectively of the outer tubular member 30. Thus, the sections of the external surface 32a mate with corresponding sections of the internal surface 30b. The (first and second) tapered sections 40c and 50c are preferably arranged axially adjacent one of the first and second externally splined surfaces 42a and 44a, as best seen in FIG. 4. More specifically, the (first and second) tapered sections 40c and 50c are preferably disposed at (axially adjacent to) the second end portions 44 and 54 of the outer and inner members 30 and 32.

However, the main external section 50a, the reduced diameter external section 54a and the (second) tapered section 50c of the inner member 32 preferably have slightly smaller diameters than corresponding internal sections of the internal surface 30b of the outer tubular member 30 to form a gap G therebetween, as best understood from FIG. 5. The Gap G is provided in order to accommodate the adhesive layer 34. The gap G is preferably 0.1 millimeter±0.025 millimeter. The gap G extends around the entire circumference of the crank shaft 20 and along the entire axial length of the crank shaft 20 between the outer tubular member 30 and the inner member 32.

Assembly of the crank shaft 20 will now be explained in more detail. First the outer and inner members 30 and 32 are constructed as separate members. Specifically, the outer tubular member is constructed using casting and/or machining or the like in a conventional manner, as explained above. The inner member 32 is preferably constructed by applying (wrapping or winding) layers of carbon fiber (e.g., fabric) sheets onto an internal bar element (core bar or inner mold) having an external shape corresponding to the desired final internal shape of the internal surface 32b of the inner member 32. Carbon fiber sheets are typically flexible sheets at room temperature that include numerous carbon fibers (e.g., unidirectional, multidirectional and/or randomly oriented fibers) held together by a binder (epoxy resin in this case). Then an external mold is applied/pressed onto the outer surface of the sheets disposed on the core bar element (inner mold), and the structure is heated to form the final external shape of the inner member 32. Once the inner member 32 cools/cures, the external mold is removed, the internal bar is removed and the inner member 32 is trimmed on its axial ends if needed.

The internal threaded surface/section 54b can be constructed by molding or machining. For example, the inner mold can have external threads so that the internal threaded section 54b is formed by molding. In this case, the inner mold is threadedly removed from the inner member 32 after it has cured. On the other hand, the inner member 32 can be constructed as described above without the internal threaded surface/section 54*b*, and the internal threaded surface/section 54*b* can be cut after curing. In either case, once the inner member 32 cures and has the internal threaded surface/section 54*b* formed. The inner member 32 is now ready to be attached to the outer tubular member 30.

The internal surface 30*b* of the outer tubular member 30 is preferably provided with a surface treatment such as a phosphate alumite treatment to enhance the adhesive bond of the adhesive layer 34 between the outer and inner members 30 and 32. An epoxy adhesive is then applied to the external surface 32*a* of the inner member 32 and/or the internal surface 30*b* of the outer tubular member 30, and the inner member 32 is slid into its final position within the longitudinal passageway 46. The epoxy adhesive will now form a thin layer in the gap G between the inner member 30 and the outer member 32.

This structure is then heated in order for the epoxy adhesive to form a substantially permanent bond between the external surface 32*a* of the inner member 32 the treated internal surface 30*b* of the outer tubular member 30. This structure is then allowed to cool/cure such that the final crank shaft 20 (illustrated in FIGS. 2, 4 and 5) with the adhesive layer 34 between the outer member 30 and the inner member 32 is obtained in accordance with the present invention. Preferably, in the finished crank shaft 20, the adhesive layer 34 is disposed between the internal surface 30*b* of the outer tubular member 30 defining the interior longitudinal passageway 46 and a majority of the tubular external surface 32*a* of the inner member 32.

Referring again to FIGS. 1 and 2, the remaining parts of the crank assembly 12 will now be explained in more detail. The right crank arm 22 basically includes an arm portion 60, a plurality of sprocket attachment arm parts 62, a centrally located splined blind bore 64 and a pedal attachment opening 66. The first end portion 42 of the outer tubular member 30 mates with the splined blind bore 64 to non-rotatably attach the right crank arm 22 to the crank shaft 20. The second maximum outer diameter $D_4$ is no larger than the uniform external diameter $D_1$ (equal as illustrated herein) so that the second end portion 44 can be inserted through the splined bore 64 of the right crank arm 22 without damaging the splined bore 64. In this embodiment, the right crank arm 22 is crimp-fastened onto the crank shaft 20 by deforming the material surrounding the splined blind bore 64 to form the configuration illustrated in FIG. 2. After crimp-fastening, the right crank arm 22 is non-movably retained on the second end portion 42. One of the pedals 28 is threadedly attached in the pedal attachment opening 66.

The left crank arm 24 basically includes an arm portion 70 having a splined, split through bore 74 located at one end of the arm portion 70 and a pedal attachment opening 76 located at the other end of the arm portion 70. The second end portion 44 of the outer tubular member 30 mates with the splined through bore 74 to non-rotatably attach the left crank arm 24 to the crank shaft 20. A pair of fasteners 78 such as threaded bolts extend across the slit of the splined, split through bore 74 to reduce the diameter of the bore 74 when tightened such that the left crank arm 24 is non-movably retained on the crank shaft 20. However, the left crank arm 24 can be removed from the crank shaft 20 when the fasteners 78 are loosened, if needed and/or desired. One of the pedals 28 is threadedly attached in the pedal attachment opening 66.

The bottom bracket structure 26 basically includes a central tubular part or cylindrical liking member 80, a first tubular end part or bearing housing 82, a second tubular end part or bearing housing 84, a first bearing assembly 86 and a second bearing assembly 88. The first and second bearing housings 82 and 84 are screwed (threaded) into the ends of the hanger H with the cylindrical linking member 80 disposed therebetween. The first and second bearing assemblies 86 and 88 are mounted in the first and second bearing housings 82 and 84, respectively. A pair of L-shaped (in cross-section) annular cover members are 87 and 89 are mounted between the crank shaft 20 and the inner rings or races of the first and second bearing assemblies 86 and 88, respectively. O-rings 83 and 85 are disposed between the first and second bearing housings 82 and 84 and the linking member 80.

Assembly of the crank assembly 12 will now be explained in more detail. Before the crank assembly 12 can be assembled, the crank shaft 20 needs to be constructed and assembled as explained above. Once the crank shaft 20 is constructed, the first end portion 42 is slid into the blind bore 64 and the right crank arm 22 is crimp-fastened onto the crank shaft 20. The bottom bracket structure 26 is mounted in the hanger 20 by threading the first and second bearing housings 82 and 84 into the hanger with the linking member 80 and the O-rings 83 disposed therebetween. Next, the first and second bearing assemblies 86 and 88 are mounted in the first and second bearing housings 82 and 84, respectively. The cover members 87 and 89 are installed at the axial ends of the first and second bearing assemblies 86 and 88. Once the cover members 87 and 89 are installed, the bottom bracket structure 26 is fully assembled.

The crank shaft 20 with the right crank arm 22 crimp-fastened thereto can then be inserted through the assembled bottom bracket structure 26 from the right side thereof. Once the second end portion 44 projects beyond the cover member 89, the left crank arm 24 can be installed on the crank shaft 20. Specifically, the second end portion 44 is slid into the splined through bore 74 and the fasteners 78 are tightened to non-movably retain the left crank arm 24 on the crank shaft 20 such that the crank assembly 12 is fully assembled. After securing the left crank arm 34, the axle bolt 36 is threaded into the crank axle 20 so that the left crank arm 24 will not come off the crank axle 20 even if the fasteners somehow become loose. Once the crank assembly is fully assembled, right and left crank arms 22 and 24 are non-movably retained on opposite ends of the crank shaft 20 such that the crank shaft is retained in the bottom bracket structure 26 within the hanger H. The crank shaft 20 is freely rotatably supported within the bottom bracket structure 26.

Referring now to FIGS. 1 and 8-13, the front hub assembly 14F will now be explained in more detail. The front hub assembly 14F basically includes the front hub shaft 18F, a hub shell 90, a pair of bearing assemblies 92, a quick release structure 94, a pair of dust caps 96 and a pair of retaining nuts 98. The front hub assembly 14F is conventional, except for the front hub shaft 18F. Accordingly, the front hub assembly 14F will not be explained and/or illustrated in detail herein, except as related to the front hub shaft 18F in accordance with the present invention. Of course, it will be apparent to those skilled in the bicycle art from this disclosure that the front hub shaft 18F can be used in other types of hub assemblies as needed and/or desired. In other words, the hub assembly 14F is merely one example utilizing the front hub shaft 18F of the present invention.

The front hub shaft 18F is constructed in a manner identical to the crank shaft 20. However, the front hub shaft 18F includes an outer tubular member 130 and an inner member 132 that are modified versions (e.g. shapes, sizes, etc.) of the outer tubular member 30 and the inner member 32. The outer tubular member 130 and the inner member 132 are constructed of the same materials and using the same manufacturing techniques as the members 30 and 32, respectively.

Moreover, the member s130 and 132 are non-movably attached together using an adhesive layer 134 in a manner identical to attachment of the members 30 and 32, discussed above. In view of the similarity between the crank shaft 20 and the front hub shaft 18F, the front hub shaft 18F will not be explained and/or illustrated in detail herein. Rather, it will be apparent to those skilled in the bicycle art from this disclosure that the descriptions and illustrations of the crank shaft 20 also apply to the front hub shaft 18F, except as explained and/or illustrated herein. In other words, the description of the front hub shaft 18F will focus on the differences between the front hub shaft 18F and the crank shaft 20.

The outer tubular member 130 includes a central portion 140, a first end portion 142 and a second end portion 144 that have the identical internal and external diameters along the entire axial length of the outer tubular member 130, except for the outer surface of the end portions 142 and 144. Specifically, outer tubular member 130 includes an external surface 130a and an internal surface 130b defining a longitudinal interior passageway 146 with a center longitudinal axis Y. The central axis Y corresponds to the rotation axis of the front hub assembly 14F. The external surface 130a has first and second oppositely threaded external surfaces (sections) 142a and 144a disposed on the first and second end portions 142 and 144, respectively, which have the inner races of the bearing assemblies 92 and the retaining nuts 98 threadedly mounted thereon. The first and second externally threaded surfaces 142a and 144a preferably have identical (first and second) maximum outer diameters no larger than the external diameter of the central portion 140 (all equal as illustrated herein).

The outer diameter of the central portion 140 is preferably constant to form a uniform external diameter along a majority of central portion 140 extending between the first and second end portions 142 and 144. These dimensions are easily seen in FIG. 12. However, reference numerals are not being given for the sake of simplicity because these dimensions are preferably equal in the front hub shaft 18F illustrated herein. The inner member 132 is preferably a tubular member having uniform external and internal circular dimensions along external and internal surfaces 132a and 132b, along an entire axial length of the inner member 132. In the front hub shaft 18F, the outer tubular member 130 preferably has a radial thickness slightly larger than the inner member 132 along a majority. Thus, at the threaded first and second end portions 142 and 144, the outer tubular member 130 is preferably as thick radially as the inner member 132.

The rear hub assembly 14R includes a rear hub shaft 18R identical to the front hub shaft 18F, except the hub shaft 18R is longer than the hub shaft 18F due to the larger (longer) structure of typical rear hub assemblies. The rear hub assembly is conventional except for the rear hub shaft 18R. Accordingly, the rear hub assembly 14R will not be explained and/or illustrated in detail herein. Moreover, in view of the similarity between the front and rear hub shafts 18F and 18R, the rear hub shaft 18R will not be discussed and/or illustrated herein. Rather, it will be apparent to those skilled in the bicycle art from this disclosure that the descriptions and illustrations of the front hub shaft 18F also apply to the rear hub shaft 18R, except the rear hub shaft 18R is longer axially than the front hub shaft 18F.

Modified Crank Assembly

Figure 14:
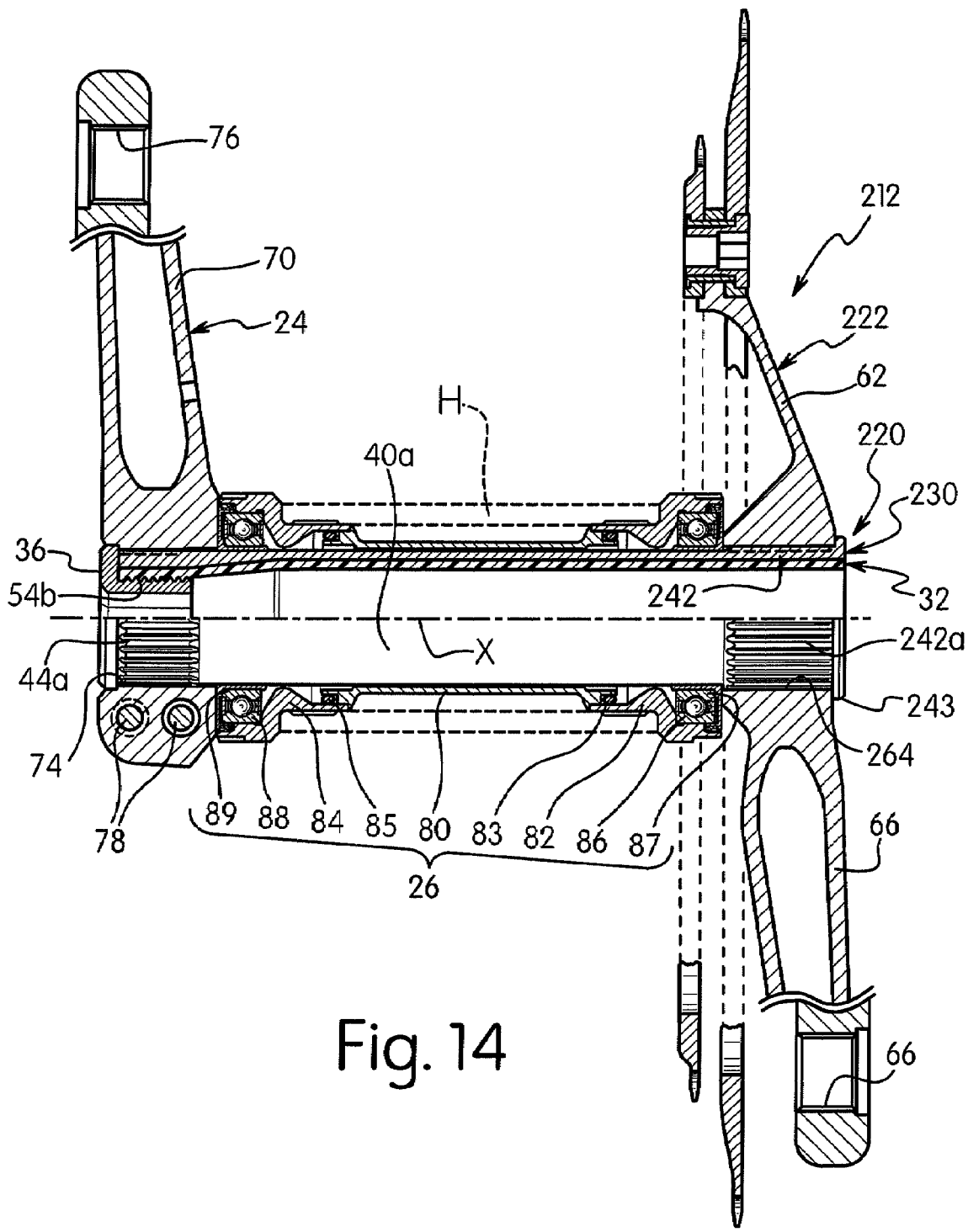
FIG. 14 is an enlarged, partial cross-sectional view of a modified crank assembly in accordance with another embodiment of the present invention.

Referring now to FIG. 14, a modified crank assembly 212 utilizing a modified crankshaft 220 and a modified right crank arm 222 in accordance with the present invention will now be explained. The crank shaft 220 is identical to the crank shaft 20, except the crank shaft 220 is designed for connection to the crank arm 222. The crank arm 222 is a non-crimp-fastened right crank arm 222. In view of the similarity between the crank assembly 12 and the crank assembly 212, the crank assembly 212 will not be explained and/or illustrated in detail herein. Rather, it will be apparent to those skilled in the bicycle art from this disclosure that the descriptions and illustrations of the crank assembly 12 also apply to the modified crank assembly 212, except as explained and/or illustrated herein.

Parts of the modified crank assembly 212 that are identical to parts of the crank assembly 12 will be given the same reference numerals. These identical parts will not be described again with reference to the modified crank assembly 212 for the sake of brevity. Parts of the modified crank assembly 212 that are not exactly identical but are functionally identical to parts of the crank assembly 12 will be given the same reference numerals with "200" added thereto for the sake of convenience. The modified crank assembly 212 is assembled in a manner identical to the crank assembly 12, except the crimp fastening step can be eliminated.

Specifically, the modified crank shaft 220 includes a modified outer tubular member 230 for use with the non-crimp-fastened right crank arm 222. The modified right crank arm 222 includes a modified splined through bore 264 rather than the splined blind bore 64 of the crank arm 22. The outer tubular member 230 includes a first end portion 242 with an annular abutment 243 extending radially outwardly from the center external surface/section 40a of the crank shaft 220 so that the annular abutment 243 abuts the crank arm 222 to prevent the right crank arm 222 from moving axially outwardly of the first end portion 242. The second maximum outer diameter $D_4$ of the second externally splined surface/section 44a is no larger than the uniform external diameter $D_1$ (equal as illustrated herein) of the center external surface/section 40a so that the crank shaft 220 can be inserted through the modified splined bore 264 of the right crank arm 22 without damaging the splined through bore 264. In other words, during assembly of the crank assembly 212, the crank shaft 20 is slid through the splined through bore 264 from the right side of the right crank arm 222 such that the annular abutment 243 contacts the right crank arm 222.

The crank shaft 220 has a splined external surface/section 242a a plurality of splines of which extends radially outwardly from the center external surface/section 40a. The splined external surface 242a is inserted into the splined bore 264 of the crank arm 222 in a press-fit manner. The second externally splined surface/section 44a at the opposite end of the crank shaft 220 does not extend outwardly of the center external surface/section 240a. The crank shaft 220 is then inserted through the bottom bracket structure 26 and attached to the left crank arm 24 in a manner identical to the crank assembly 12. The abutment 243 does not have to extend completely circumferentially around the crank shaft 220. In other words, it will be apparent to those skilled in the art from this disclosure that the abutment does not necessarily have to have an annular configuration.

The crank shaft 220 is identical to the crank shaft 20, except for the outer tubular member 230. Moreover, the outer tubular member 220 is identical to the outer tubular member 20, except for the second end portion 242. The splined external surface 242a is disposed radially inwardly of the splined external surface 42a of the outer tubular member 30 but not radially inwardly of the center external surface/section 40a. Specifically, because the right crank arm 222 is not crimp-fastened to the crank shaft 220, the abutment 48 of the crank shaft 20 can be omitted. Thus, the splined external surface (section) 242a preferably has an outer maximum diameter larger than the uniform outer diameter $D_1$ but smaller than the first outer maximum diameter $D_2$, and a minimum outer diameter no smaller than (preferably equal to) the uniform outer diameter $D_1$ such that the abutment 48 is eliminated. Due to this arrangement, the splined through bore 264 preferably has a slightly smaller diameter(s) than the splined blind bore 64 of the right crank arm 22. Optionally, the first end portion 242 (portion having the splined external surface 242a) of the crank shaft 220 can be the same radial thickness as the first end portion 42 of the crank shaft 20 so that the abutment 48 is still present, if needed and/or desired.

While the present invention is particularly suited to crank and hub shafts, it will be apparent to those skilled in the bicycle art from this disclosure that the present invention can be utilized in any bicycle shaft component as needed and/or desired. For example, it will be apparent to those skilled in the bicycle art from this disclosure that handle bars or seat posts are examples of other bicycle shaft components to which the present invention could be applied.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle crank shaft comprising:
an outer tubular member including a center portion, a first end portion and a second end portion with an interior longitudinal passageway extending between the first and second end portions, the interior longitudinal passageway having a longitudinal center axis extending therethrough, the center portion extending between the first and second end portions and being configured to be rotatably mounted in a bottom bracket structure of a bicycle, the first end portion having a first externally splined surface, the second end portion having a second externally splined surface, the center portion having a thickness measured in a radial direction relative to the longitudinal center axis, the first and second end portion having respective thicknesses that are greater than the thickness of the center portion; and
an inner member non-movably attached to the outer tubular member within the interior longitudinal passageway,
the outer tubular member being constructed of a first material having a first specific gravity and the inner member being constructed of a second material having a second specific gravity that is lower than the first specific gravity of the first material and the first externally splined surface extending extends radially outwardly of the uniform external diameter and the second externally splined surface does not extend radially outwardly of the uniform external diameter.

2. A bicycle crank shaft according to claim 1, wherein the first material is a metallic material.

3. A bicycle crank shaft according to claim 2, wherein the first, metallic material includes aluminum.

4. A bicycle crank shaft according to claim 2, wherein the second material is a non-metallic material.

5. A bicycle crank shaft according to claim 4, wherein the second, non-metallic material includes carbon fibers.

6. A bicycle crank shaft according to claim 4, wherein the outer tubular member has a first axial length and the inner member has a second axial length that is at least 75% of the first axial length.

7. A bicycle crank shaft according to claim 1, wherein the second material is a non-metallic material.

8. A bicycle crank shaft according to claim 7, wherein the second, non-metallic material includes carbon fibers.

9. A bicycle crank shaft according to claim 1, wherein the outer and inner members are non-movably attached together with an adhesive.

10. A bicycle crank shaft according to claim 9, wherein the inner member has a tubular external surface and the adhesive is arranged as a layer between an internal surface of the outer tubular member defining the interior longitudinal passageway and a majority of the tubular external surface of the inner member.

11. A bicycle crank shaft according to claim 10, wherein the outer tubular member has a first axial length and the inner member has a second axial length that is at least 75% of the first axial length.

12. A bicycle crank shaft according to claim 1, wherein the outer tubular member has a uniform external diameter along a majority of an axial length between the first and second end portions.

13. A bicycle crank shaft according to claim 1, wherein the first externally splined surface has a first maximum outer diameter larger than the uniform external diameter, and the second externally splined surface has a second maximum outer diameter equal to the uniform external diameter.

14. A bicycle crank shaft according to claim 13, wherein the first externally splined surface has a first minimum outer diameter larger than the uniform external diameter.

15. A bicycle crank shaft according to claim 1, wherein an internal surface of the outer tubular member defining the interior longitudinal passageway has a first tapered section, and the inner member has a tubular external surface with a second tapered section that mates with the first tapered section.

16. A bicycle crank shaft according to claim 15, wherein the first and second tapered sections are arranged axially adjacent one of the first and second externally splined surfaces.

17. A bicycle crank shaft according to claim 15, wherein the first tapered section is disposed at the second end portion of the outer tubular member.

18. A bicycle crank shaft according to claim 1, wherein the outer tubular member has a first axial length and the inner member has a second axial length that is at least 75% of the first axial length.

19. A bicycle crank shaft according to claim 1, wherein an internal surface of the outer tubular member defining the interior longitudinal passageway has at least one first tapered section, and the inner member has a tubular external surface with at least one second tapered section that mates with the first tapered section.

20. A bicycle crank shaft according to claim 19, wherein the outer tubular member has a first axial length and the inner member has a second axial length that is at least 75% of the first axial length.

21. A bicycle crank shaft according to claim 1, wherein the outer tubular member has a first axial length and the inner member has a second axial length that is at least 75% of the first axial length.

22. A bicycle crank shaft according to claim 1, wherein the inner member is a tubular member.

23. A bicycle crank shaft comprising:

an outer tubular member including a center portion, a first end portion and a second end portion with an interior longitudinal passageway extending between the first and second end portions, the interior longitudinal passageway having a longitudinal center axis extending therethrough, the center portion extending between the first and second end portions and being configured to be rotatably mounted in a bottom bracket structure of a bicycle, the first end portion having a first externally splined surface, the second end portion having a second externally splined section, the center portion having a thickness measured in a radial direction relative to the longitudinal center axis, the first and second end portion having respective thicknesses that are greater than the thickness of the center portion; and an inner member non-movably attached to the outer tubular member within the interior longitudinal passageway, the outer tubular member being constructed of a first material having a first specific gravity and the inner member being constructed of a second material having a second specific gravity that is lower than the first specific gravity of the first material and the second externally splined surface is disposed radially inwardly of the first externally splined surface.

* * * * *